United States Patent
Kim et al.

(10) Patent No.: US 10,337,772 B2
(45) Date of Patent: Jul. 2, 2019

(54) HYBRID SOLAR HEAT ABSORPTION COOLING SYSTEM

(71) Applicant: KOREA INSTITUTE OF ENERGY RESEARCH, Daejeon (KR)

(72) Inventors: Jong Kyu Kim, Daejeon (KR); Yong Heack Kang, Daejeon (KR); Hyun Jin Lee, Daejeon (KR); Sang Nam Lee, Daejeon (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 429 days.

(21) Appl. No.: 15/304,845

(22) PCT Filed: Nov. 26, 2014

(86) PCT No.: PCT/KR2014/011391
§ 371 (c)(1),
(2) Date: Oct. 17, 2016

(87) PCT Pub. No.: WO2016/035936
PCT Pub. Date: Mar. 10, 2016

(65) Prior Publication Data
US 2017/0184329 A1    Jun. 29, 2017

(30) Foreign Application Priority Data
Sep. 4, 2014    (KR) .................. 10-2014-0117628

(51) Int. Cl.
*F25B 30/06* (2006.01)
*F24S 10/00* (2018.01)
(Continued)

(52) U.S. Cl.
CPC ............ *F25B 30/06* (2013.01); *F22B 1/00* (2013.01); *F22B 1/006* (2013.01); *F24D 3/00* (2013.01);
(Continued)

(58) Field of Classification Search
CPC .......... F25B 30/00; F25B 30/04; F25B 30/06; F25B 27/00; F25B 27/002; F25B 27/007;
(Continued)

(56) References Cited

U.S. PATENT DOCUMENTS 4,007,776 A * 2/1977 Alkasab ................ F24F 5/0046
126/585
4,100,756 A    7/1978 Albertson
(Continued)

FOREIGN PATENT DOCUMENTS

KR    20-0445537 Y1    8/2009
KR    10-1058908 B1    8/2011
(Continued)

OTHER PUBLICATIONS

International Search Report for PCT/KR2014/011391 dated May 27, 2015 from Korean Intellectual Property Office.

*Primary Examiner* — Cassey D Bauer
*Assistant Examiner* — Miguel A Diaz
(74) *Attorney, Agent, or Firm* — Revolution IP, PLLC

(57) ABSTRACT

Provided is an hybrid solar heat absorption cooling system comprising: an absorption refrigerator; a solar heat steam generator configured to generate steam using solar heat; a daytime steam supplying unit configured to supply steam generated by the solar heat steam generator during the day as a heat source for the absorption refrigerator; a daytime hot water storage tank configured to store hot water discharged from the absorption refrigerator during the day; a nighttime hot water supplying unit configured to supply hot water stored in the daytime hot water storage tank during the night as a heat source for the absorption refrigerator; a nighttime hot water storage tank configured to store hot water discharged from the absorption refrigerator during the night; and a daytime hot water supplying unit configured to supply
(Continued)

hot water stored in the nighttime hot water storage tank during the day to the solar heat steam generator.

8 Claims, 9 Drawing Sheets

(51) Int. Cl.

| | | |
|---|---|---|
| F25B 27/00 | (2006.01) | |
| F25B 15/00 | (2006.01) | |
| F24S 10/40 | (2018.01) | |
| F24D 3/10 | (2006.01) | |
| F24D 3/00 | (2006.01) | |
| F22B 1/00 | (2006.01) | |
| F24S 20/40 | (2018.01) | |
| F25B 30/00 | (2006.01) | |
| F24S 10/20 | (2018.01) | |
| F25B 30/04 | (2006.01) | |
| F24D 11/00 | (2006.01) | |
| F28D 20/00 | (2006.01) | |
| F24D 11/02 | (2006.01) | |

(52) U.S. Cl.
CPC ............... *F24D 3/10* (2013.01); *F24S 10/00* (2018.05); *F24S 10/20* (2018.05); *F24S 10/40* (2018.05); *F24S 20/40* (2018.05); *F25B 27/00* (2013.01); *F25B 27/002* (2013.01); *F25B 27/007* (2013.01); *F25B 30/00* (2013.01); *F25B 30/04* (2013.01); *F24D 11/003* (2013.01); *F24D 11/0221* (2013.01); *F24D 2220/08* (2013.01); *F25B 15/00* (2013.01); *F25B 2400/24* (2013.01); *F28D 2020/0004* (2013.01); *F28D 2020/0026* (2013.01); *F28D 2020/0065* (2013.01); *F28D 2020/0078* (2013.01); *Y02A 30/272* (2018.01); *Y02A 30/276* (2018.01); *Y02A 30/277* (2018.01); *Y02A 30/278* (2018.01); *Y02B 30/62* (2013.01)

(58) Field of Classification Search
CPC ....... F28D 2020/004; F28D 2020/0026; F28D 2020/0065; F28D 2020/0078; F28D 2020/0082; F28D 20/0034; F24D 3/00; F24D 3/10; F24D 11/00; F24D 11/003; F24D 11/007; F24D 11/0221; F24D 2220/08; F24S 10/00; F24S 10/20; F24S 10/40; F24S 20/40; F22B 1/00; F22B 1/006; Y02A 30/272; Y02A 30/276; Y02A 30/277; Y02A 30/278

See application file for complete search history.

(56) References Cited

U.S. PATENT DOCUMENTS

| | | | | |
|---|---|---|---|---|
| 4,129,177 A * | 12/1978 | Adcock | .................. | F24F 5/0046 165/48.2 |
| 4,151,721 A * | 5/1979 | Kumm | .................. | F24F 5/0046 62/79 |
| 4,179,895 A * | 12/1979 | Shimokawa | .......... | F25B 15/008 62/235.1 |
| 4,281,515 A * | 8/1981 | Ferriera | .................. | F25B 15/06 62/235.1 |
| 4,285,211 A * | 8/1981 | Clark | ...................... | F25B 25/02 62/335 |
| 4,429,545 A * | 2/1984 | Steinberg | ............... | F25B 27/007 62/235.1 |
| 4,446,853 A * | 5/1984 | Adcock | .................. | F24F 5/0046 126/707 |
| 4,470,269 A * | 9/1984 | Takemi | .................. | F25B 15/02 62/235.1 |
| 4,509,337 A * | 4/1985 | Wiart | ...................... | F25B 17/08 62/235.1 |
| 4,586,345 A * | 5/1986 | Friberg | .................. | F25B 17/08 62/235.1 |
| 9,488,394 B1 * | 11/2016 | El-Shaarawi | ......... | F25B 27/007 |
| 9,702,597 B1 * | 7/2017 | El-Shaarawi | ......... | F25B 27/007 |
| 9,797,385 B2 * | 10/2017 | Dethier | .................. | F22B 1/006 |
| 10,066,856 B2 * | 9/2018 | Ibrahim | .................. | F25B 27/007 |
| 2003/0074901 A1 | 4/2003 | Bellac | .................. | F01K 21/047 60/772 |
| 2009/0090488 A1 * | 4/2009 | McCann | ............... | F24F 5/0035 165/104.31 |
| 2012/0125321 A1 * | 5/2012 | Graboski | ................ | F28D 7/022 126/643 |
| 2012/0285189 A1 * | 11/2012 | Takeda | ...................... | F01K 3/24 62/235.1 |
| 2012/0298204 A1 * | 11/2012 | Erez | ...................... | G06Q 50/06 137/1 |
| 2012/0312043 A1 * | 12/2012 | Kim | .................... | F24D 11/0221 62/235.1 |
| 2013/0276774 A1 * | 10/2013 | Simiano | .............. | F28D 20/0034 126/640 |
| 2013/0284163 A1 * | 10/2013 | Flamant | ................ | B01J 8/1809 126/634 |
| 2014/0033708 A1 * | 2/2014 | Groppel | .................. | F22B 1/006 60/641.8 |
| 2014/0216717 A1 * | 8/2014 | O'Donnell | ............... | E21B 43/24 166/90.1 |
| 2014/0250931 A1 * | 9/2014 | Chen | ...................... | F24F 5/0017 62/235.1 |
| 2015/0000277 A1 * | 1/2015 | Reynolds | ................ | F03G 6/067 60/641.15 |
| 2015/0159885 A1 * | 6/2015 | Dennis | ................ | F24D 17/0015 62/235.1 |
| 2015/0176869 A1 * | 6/2015 | Said | ........................ | F25B 17/00 62/101 |
| 2015/0285542 A1 * | 10/2015 | Said | ...................... | F25B 27/007 62/106 |
| 2015/0300702 A1 * | 10/2015 | Said | ........................ | F25B 27/007 62/99 |
| 2015/0300703 A1 * | 10/2015 | Said | ........................ | F25B 17/02 62/106 |
| 2016/0305408 A1 * | 10/2016 | Dethier | .................. | F22B 1/006 |
| 2016/0356553 A1 * | 12/2016 | Lenk | ........................ | F01K 3/12 |
| 2016/0370122 A1 * | 12/2016 | Fu | ............................ | F24D 3/18 |
| 2017/0082327 A1 * | 3/2017 | Abdulkareem | ....... | F25B 27/007 |
| 2017/0130998 A1 * | 5/2017 | El-Shaarawi | ........... | F25B 15/06 |
| 2017/0138649 A1 * | 5/2017 | Ibrahim | ................ | F25B 27/007 |
| 2017/0261243 A1 * | 9/2017 | El-Shaarawi | ......... | F25B 27/007 |
| 2017/0370622 A1 * | 12/2017 | Shin | ........................ | F25B 30/02 |

FOREIGN PATENT DOCUMENTS

| | | |
|---|---|---|
| KR | 10-2014-0002140 A | 1/2014 |
| KR | 10-2014-0002526 A | 1/2014 |

* cited by examiner

HYBRID SOLAR HEAT ABSORPTION COOLING SYSTEM

CROSS REFERENCE TO PRIOR APPLICATIONS

This application is a National Stage Application of PCT International Patent Application No. PCT/KR2014/011391 filed on Nov. 26, 2014, under 35 U.S.C. § 371, which claims priority to Korean Patent Application No. 10-2014-0117628 filed on Sep. 4, 2014, which are all hereby incorporated by reference in their entirety.

TECHNICAL FIELD

The present invention relates to a hybrid solar heat absorption cooling system, and more particularly, to a hybrid solar heat absorption cooling system that enables twenty-four hour cooling using steam generated by solar heat and hot water as a heat source for an absorption refrigerator.

BACKGROUND ART

In general, an absorption refrigerator that is a system for obtaining cold and heat using various types of heat sources includes an absorber that absorbs a refrigerant using an absorbent, a regenerator that regenerates the refrigerant by heating the absorbed refrigerant, a condenser that condenses the refrigerant, and an evaporator that evaporates the refrigerant.

These days, concerns and research into a hybrid absorption cooling system using solar heat as a heat source for the absorption refrigerator have been increased.

However, in a conventional hybrid absorption cooling system using solar heat, because solar heat cannot be supplied to the hybrid absorption cooling system during the night, or at a rainy or cloudy day, there is a limitation in operating the absorption refrigerator.

DETAILED DESCRIPTION OF THE INVENTION

Technical Problem

The present invention provides a hybrid cooling system that enables twenty-four hour cooling using solar heat.

Technical Solution

According to an aspect of the present invention, there is provided a hybrid solar heat absorption cooling system including: an absorption refrigerator; a solar heat steam generator configured to generate steam using solar heat; a daytime steam supplying unit configured to supply steam generated by the solar heat steam generator during the day as a heat source for the absorption refrigerator; a daytime hot water storage tank configured to store hot water discharged from the absorption refrigerator during the day; a nighttime hot water supplying unit configured to supply hot water stored in the daytime hot water storage tank during the night as a heat source for the absorption refrigerator; a nighttime hot water storage tank configured to store hot water discharged from the absorption refrigerator during the night; and a daytime hot water supplying unit configured to supply hot water stored in the nighttime hot water storage tank during the day to the solar heat steam generator.

According to another aspect of the present invention, there is provided a hybrid solar heat absorption cooling system including: an absorption refrigerator; a solar heat steam generator including a concentration solar collector configured to collect solar heat and to generate wet steam by heat-exchanging with hot water and a steam drum configured to separate the wet steam generated by the concentration solar collector into dry steam and water; a daytime steam supplying unit configured to supply the dry steam generated by the solar heat steam generator during the day as a heat source for the absorption refrigerator; a daytime hot water storage tank configured to store the hot water discharged from the absorption refrigerator during the day; a nighttime hot water supplying flow path that connects the daytime hot water storage tank and the absorption refrigerator to guide the hot water in the daytime hot water storage tank to the absorption refrigerator during the night; a nighttime hot water pump installed on the nighttime hot water supplying flow path and operating during the night; a nighttime hot water storage tank configured to store the hot water discharged from the absorption refrigerator during the night; a daytime hot water supplying flow path that connects the nighttime hot water storage tank and the solar heat steam generator to guide the hot water in the nighttime hot water storage tank to the solar heat steam generator during the day; a daytime pressing hot water pump installed on the daytime hot water supplying flow path and operating during the day; a temperature sensor installed in the daytime hot water storage tank; and a bypass flow path that bypasses at least part of the hot water separated from the steam drum to the daytime hot water storage tank when the temperature detected by the temperature sensor is less than a predetermined set temperature.

According to still another aspect of the present invention, there is provided a hybrid solar heat absorption cooling system including: an absorption refrigerator; a solar heat steam generator including a concentration solar collector configured to collect solar heat and to generate wet steam by heat-exchanging with hot water and a steam drum configured to separate the wet steam generated by the concentration solar collector into dry steam and water; a daytime steam supplying unit configured to supply the dry steam generated by the solar heat steam generator during the day as a heat source for the absorption refrigerator; a daytime hot water storage tank configured to store the hot water discharged from the absorption refrigerator during the day; a nighttime hot water supplying flow path that connects the daytime hot water storage tank and the absorption refrigerator to guide the hot water in the daytime hot water storage tank to the absorption refrigerator during the night; a nighttime hot water pump installed on the nighttime hot water supplying flow path and operating during the night; a nighttime hot water storage tank configured to store the hot water discharged from the absorption refrigerator during the night; a daytime hot water supplying flow path that connects the nighttime hot water storage tank and the solar heat steam generator to guide the hot water in the nighttime hot water storage tank to the solar heat steam generator during the day; a daytime pressing hot water pump installed on the daytime hot water supplying flow path and operating during the day; a temperature sensor installed in the daytime hot water storage tank; and an auxiliary heater configured to heat the hot water stored in the daytime hot water storage tank when the temperature detected by the temperature sensor is less than a predetermined set temperature.

Effects of the Invention

According to the present invention, during the day, steam is generated using solar heat and is used as a heat source for an absorption refrigerator, and during the night, hot water stored during the day is used as the heat source for the absorption refrigerator so that twenty-four hour cooling can be performed.

In addition, a concentration solar collector is used to generate the steam using solar heat, such that a higher temperature and a larger amount of hot water can be obtained, compared with a flat plate type or vacuum tube type concentrator, thereby providing the advantage of easier twenty-four hour cooling.

Furthermore, the heat obtained from the solar heat is directly used for cooling instead of generating electricity, thereby having high efficiency.

Moreover, according to the temperature of hot water stored in a daytime hot water storage tank, the hot water separated from a steam drum is bypassed to the daytime hot water storage tank such that the temperature of the hot water in the daytime hot water storage tank is maintained at a set temperature or higher so as to be efficiently used during the night.

MODE OF THE INVENTION

Hereinafter, a hybrid solar heat absorption cooling system according to embodiments of the present invention will be described in detail with reference to the accompanying drawings.

Figure 1:
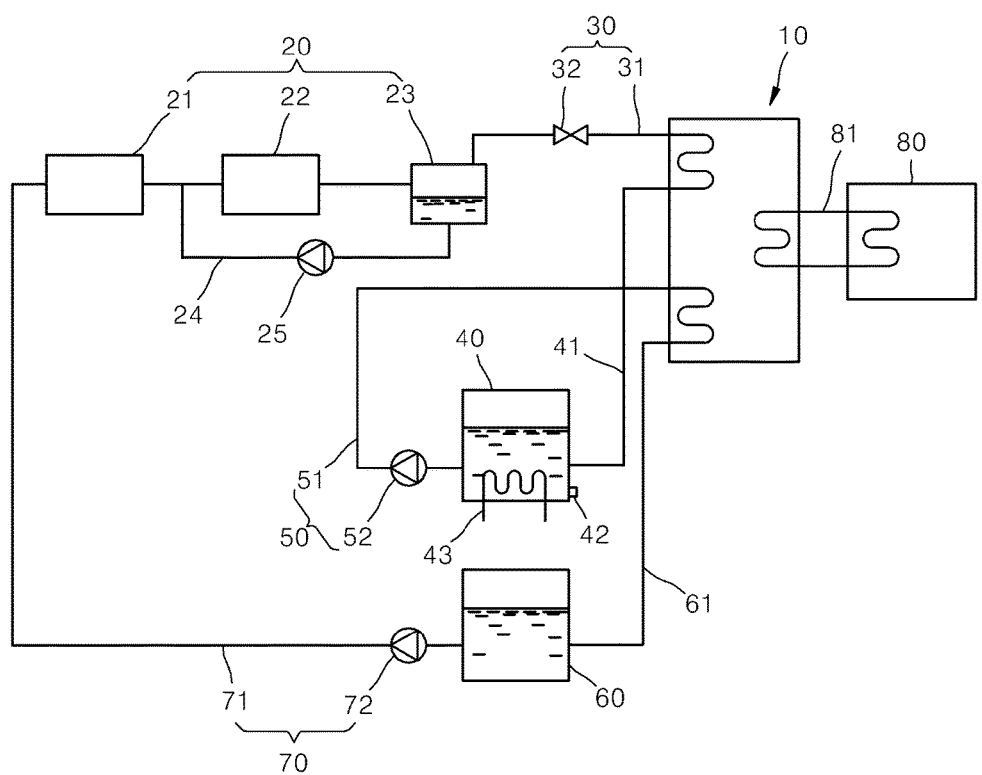
FIG. 1 is a schematic view of a configuration of a hybrid solar heat absorption cooling system according to a first embodiment of the present invention.

FIG. 1 is a schematic view of a configuration of a hybrid solar heat absorption cooling system according to a first embodiment of the present invention.

Referring to FIG. 1, the hybrid solar heat absorption cooling system according to the first embodiment of the present invention includes an absorption refrigerator 10, a solar heat steam generator 20, a daytime steam supplying unit 30, a daytime hot water storage tank 40, a nighttime hot water supplying unit 50, a nighttime hot water storage tank 60, and a daytime hot water supplying unit 70.

The absorption refrigerator 10 includes an absorber, a regenerator, a condenser, an evaporator, a cooling tower, and an indoor unit. The absorber (not shown) introduces refrigerant steam evaporated by the evaporator and allows the refrigerant steam to be absorbed into a refrigerant-absorbent mixture. The regenerator (not shown) allows part of the refrigerant to be evaporated from the refrigerant-absorbent mixture discharged from the absorber. The regenerator (not shown) receives a heat source from the steam generated by the solar heat steam generator 20. The condenser (not shown) performs heat-exchanging of the refrigerant steam discharged from the regenerator with cooling water so as to condense the refrigerant. The evaporator (not shown) evaporates the refrigerant condensed by the condenser.

The absorption refrigerator 10 may be connected to an indoor unit 80 for indoor cooling and a cooling flow path 81 and may supply low-temperature cooling water cooled while passing through the evaporator to the evaporator so as to perform indoor cooling.

The solar heat steam generator 20 is a device for generating steam by collecting solar heat. The solar heat steam generator 20 includes a preheater 21 that primarily preheats the hot water supplied from the nighttime hot water storage tank 60 by collecting solar heat, a heater 22 that secondarily heats the hot water discharged from the preheater 21 by collecting solar heat and evaporates the hot water, and a steam drum 23 that separates wet steam generated by the heater 22 into dry steam and hot water, supplies the dry steam to the daytime steam supplying unit 30 and allows the hot water to be circulated into the heater 22.

Each of the preheater 21 and the heater 22 uses a concentration solar collector. The concentration solar collector includes a linear Fresnel reflector (LFR), a parabolic trough concentrator (PTC), etc. In the current embodiment, an example in which the LFR is used as the concentration solar collector, has been described.

The steam drum 23 has one side to which a hot water circulation flow path 24 for circulating the separated hot water into an inlet of the heater 22 is connected, and the other side to which the daytime steam supplying unit 30 is connected to supply the separated dry steam to the absorption refrigerator 10. In the current embodiment, an example in which the steam drum 23 is used, has been described. However, embodiments of the present invention are not limited thereto, and any device that separates the wet steam generated by the heater 22 into liquid and gas, may be used.

A hot water circulation pump 25 is installed on the hot water circulation flow path 24.

In the current embodiment, an example in which the hot water supplied from the nighttime hot water storage tank 60 is heated by the preheater 21 and the heater 22 twice, has been described. However, embodiments of the present invention are not limited thereto. Only one heater may also be provided. When only one heater is provided, preferably, the hot water separated from the steam drum is circulated into a middle point of the heater.

The daytime steam supplying unit 30 includes a daytime steam supplying flow path 31 that connects the steam drum 23 and the absorption refrigerator 10, and a daytime steam supplying valve 32 that is installed on the daytime steam supplying flow path 31 and is opened during the day and is closed during the night. The daytime steam supplying unit 30 supplies the dry steam separated from the steam drum 23 as the heat source for the absorption refrigerator 10.

The daytime hot water storage tank 40 is a tank that stores the hot water discharged after the heat source is supplied to the absorption refrigerator 10 during the day. The daytime hot water storage tank 40 and the absorption refrigerator 10 are connected to each other via a daytime hot water storage flow path 41. The daytime hot water storage tank 40 stores the hot water during the day, and the stored hot water is supplied as the heat source for the absorption refrigerator 10 during the night via the nighttime hot water supplying unit 50.

The daytime hot water storage tank 40 includes a temperature sensor 42 that measures the temperature of the stored hot water, and an auxiliary heater 43 that heats the hot water stored in the daytime hot water storage tank 40. The temperature of the hot water discharged after the heat source is supplied to the absorption refrigerator 10 and stored in the daytime hot water storage tank 40 is about 80° C. However, as a refrigeration load of the absorption refrigerator 10 increases, the temperature of the hot water stored in the daytime hot water storage tank 40 is lowered. Thus, when the temperature measured by the temperature sensor 42 is less than a predetermined set temperature, the auxiliary heater 43 may be operated to heat the hot water stored in the daytime hot water storage tank 40. When the temperature of the hot water stored in the daytime hot water storage tank 40 is less than the set temperature, there is a limitation in supplying the hot water as the heat source for the absorption refrigerator 10. Thus, the hot water may be heated using the auxiliary heater 43 at the set temperature or higher.

The nighttime hot water supplying unit 50 includes a nighttime hot water supplying flow path 51 and a nighttime hot water pump 52. The nighttime hot water supplying flow path 51 connects the daytime hot water storage tank 40 and the absorption refrigerator 10, thereby supplying the hot water in the daytime hot water storage tank 40 to the absorption refrigerator 10 during the night. The nighttime hot water pump 52 is installed on the nighttime hot water supplying flow path 51, operates during the night, and pumps the hot water stored in the daytime hot water storage tank 40.

The nighttime hot water storage tank 60 is a tank that stores the hot water discharged after the heat source is supplied to the absorption refrigerator 10 during the night. The nighttime hot water storage tank 60 and the absorption refrigerator 10 are connected to each other via the nighttime hot water storage flow path 61. The nighttime hot water storage tank 60 stores the hot water during the night, and the stored hot water is re-circulated into the preheater 21 during the day via the daytime hot water supplying unit 70.

The daytime hot water supplying unit 70 includes a daytime hot water supplying flow path 71 and a daytime pressing hot water pump 72. The daytime hot water supplying flow path 71 connects the nighttime hot water storage tank 60 and the preheater 21, thereby supplying the hot water stored in the nighttime hot water storage tank 60 during the day to the preheater 21. The daytime pressing hot water pump 72 is installed on the daytime hot water supplying flow path 71, operates during the day, and pumps the hot water stored in the nighttime hot water storage tank 60.

An operation of the hybrid solar heat absorption cooling system having the above configuration according to the first embodiment of the present invention will be described as below.

Figure 2:
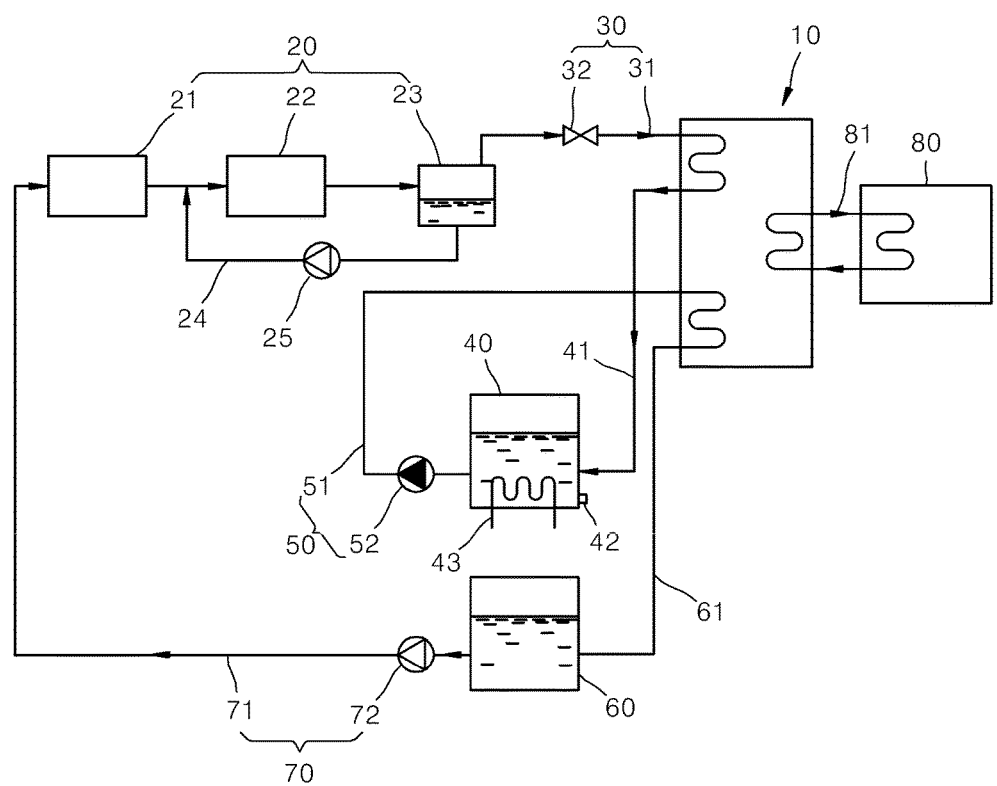
FIG. 2 is a view of a daytime operating state of the hybrid solar heat absorption cooling system illustrated in FIG. 1.

FIG. 2 is a view of a daytime operating state of the hybrid solar heat absorption cooling system illustrated in FIG. 1.

Referring to FIG. 2, when the daytime pressing hot water pump 72 operates during the day, the hot water stored in the nighttime hot water storage tank 60 is supplied to the preheater 21.

The preheater 21 collects solar heat and preheats the hot water supplied via the daytime hot water supplying flow path 71 using collected solar heat.

The hot water preheated by the preheater 21 is supplied to the heater 22. The heater 22 collects solar heat and heats the hot water discharged from the preheater 21 using collected solar heat. The hot water supplied from the preheater 21 is heated by the heater 22 and becomes wet steam. The temperature of the wet steam discharged from the heater 22 is a saturation temperature of a refrigerator supplying steam pressure.

The wet steam generated by the heater 22 is supplied to the steam drum 23. The steam drum 23 separates the wet steam into dry steam and water. The dry steam separated from the steam drum 23 is supplied to the absorption refrigerator 10 via the daytime steam supplying flow path 31, and separated water is circulated into the inlet of the heater 22 via the hot water circulation flow path 24.

The high-temperature dry steam separated from the steam drum 23 is supplied as the heat source for the absorption refrigerator 10.

That is, during the day, the high-temperature dry steam generated by the solar heat steam generator 20 is supplied as the heat source for the absorption refrigerator 10. The high-temperature dry steam is used to operate the regenerator of the absorption refrigerator 10, and the absorption refrigerator 10 generates low-temperature cooling water via an absorption refrigeration cycle.

The cooling water generated by an operation of the absorption refrigerator 10 is used to cool the indoor unit 80.

The hot water discharged after the heat source is supplied to the absorption refrigerator 10, is stored in the daytime hot water storage tank 40 via the daytime hot water storage flow path 41. The temperature of the hot water discharged after the heat source is supplied to the absorption refrigerator 10, is about 80° C.

Figure 3:
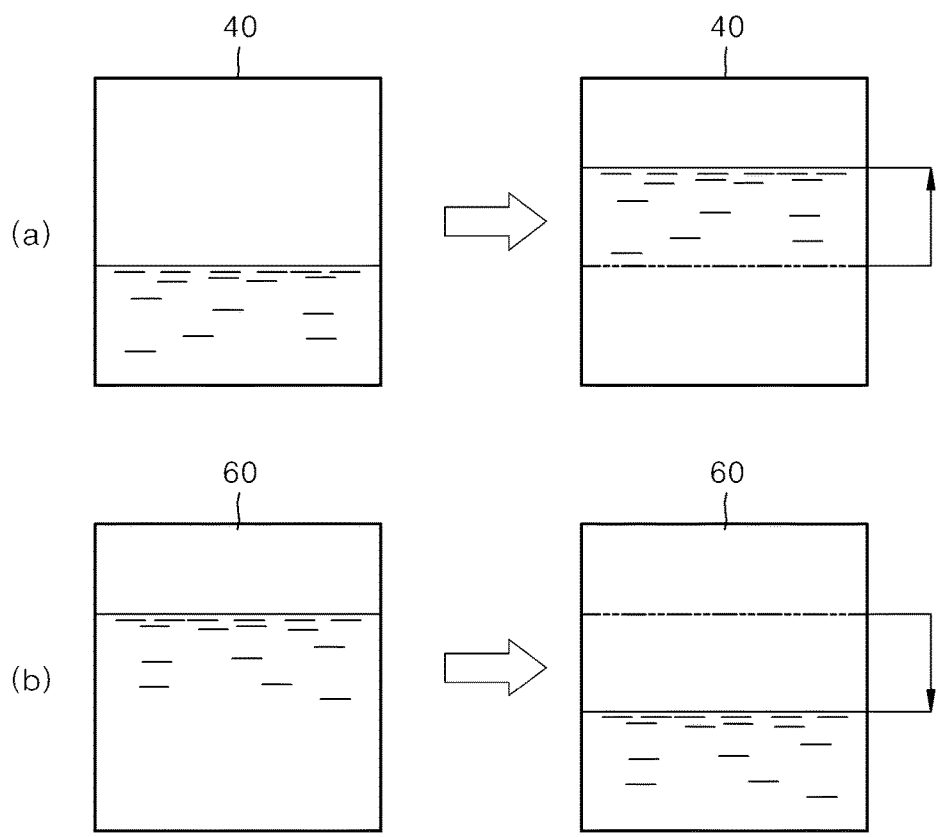
FIG. 3 is a view of a change in water levels of the daytime hot water storage tank and a nighttime hot water storage tank illustrated in FIG. 2.

As described above, the dry steam generated by the solar heat steam generator 20 is continuously supplied as the heat source for the absorption refrigerator 10, and the hot water discharged from the absorption refrigerator 10 is continuously stored in the daytime hot water storage tank 40. Thus, as illustrated in FIG. 3A, the water level of the daytime hot water storage tank 40 is gradually increased during the day.

Meanwhile, during the day, the hot water stored in the nighttime hot water storage tank 60 is continuously supplied to the solar heat steam generator 20. Thus, as illustrated in FIG. 3B, during the day, the water level of the hot water stored in the nighttime hot water storage tank 60 is gradually decreased.

Figure 4:
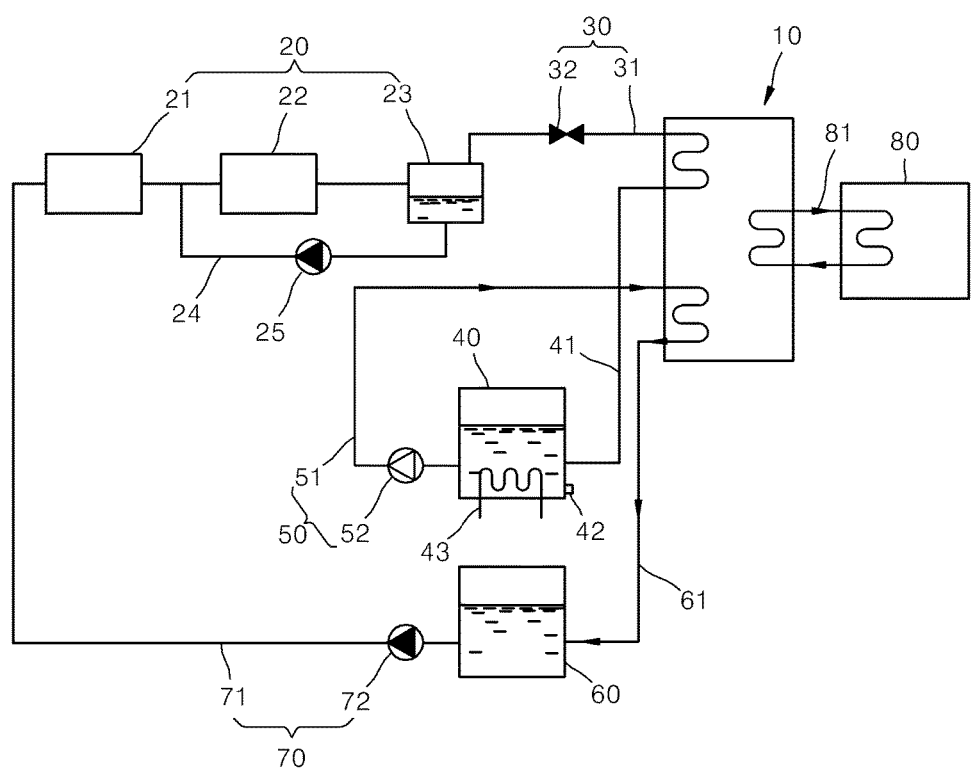
FIG. 4 is a view of a nighttime operating state of the hybrid solar heat absorption cooling system illustrated in FIG. 1.

Meanwhile, FIG. 4 is a view of a nighttime operating state of the hybrid solar heat absorption cooling system illustrated in FIG. 1.

Referring to FIG. 4, because solar heat is not collected during the night at which no sunlight is present, the daytime steam supplying valve 32 is closed, and an operation of the daytime pressing hot water pump 72 is stopped, and the nighttime hot water pump 52 operates.

When the nighttime hot water pump 52 operates, the hot water stored in the daytime hot water storage tank 40 is supplied to the absorption refrigerator 10 via the nighttime hot water supplying flow path 51. That is, during the night, the hot water stored in the daytime hot water storage tank 40 during the day is supplied as the heat source for the absorption refrigerator 10.

The absorption refrigerator 10 generates low-temperature cooling water by actuating the absorption refrigeration cycle using the hot water supplied from the daytime hot water storage tank 40 as a heat source, and the generated cooling water is used to cool the indoor unit 80.

Thus, the supply of the heat source to the absorption refrigerator 10 may be performed even during the night, as well as during the day, such that twenty-four hour cooling of the absorption refrigerator 10 is performed.

The hot water discharged after the heat source is supplied to the absorption refrigerator 10, is stored in the nighttime hot water storage tank 60 via the nighttime hot water storage flow path 61.

Figure 5:
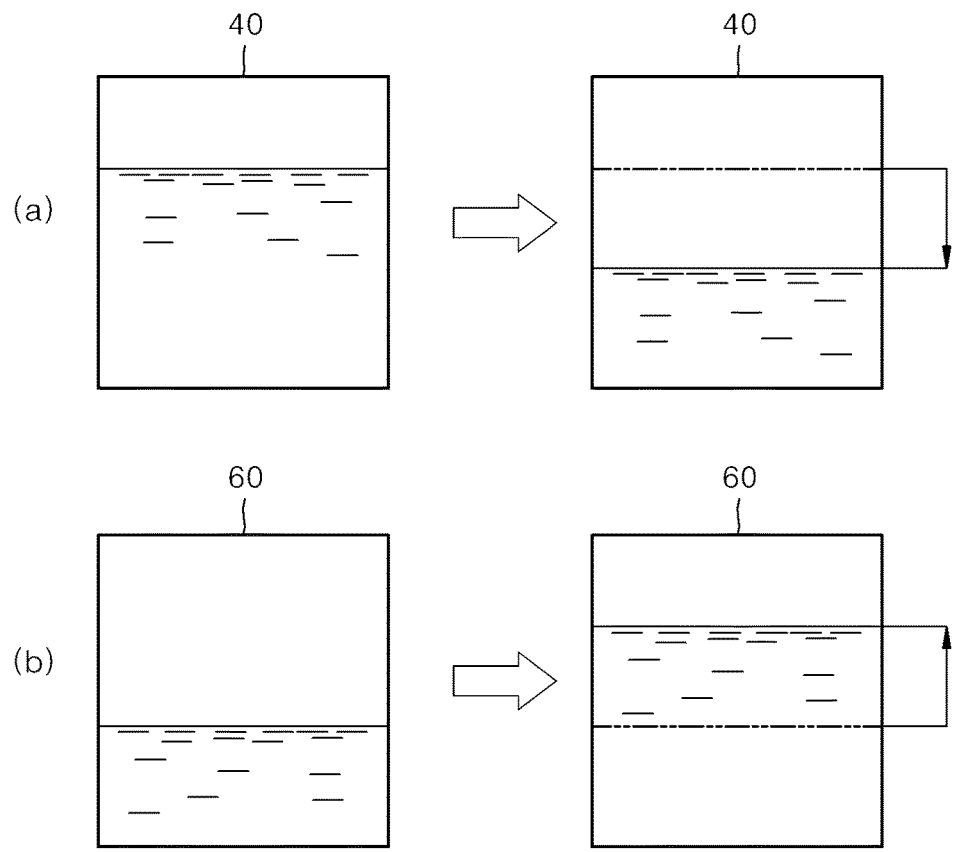
FIG. 5 is a view of a change in water levels of the daytime hot water storage tank and the nighttime hot water storage tank illustrated in FIG. 4.

As described above, during the night, the hot water stored in the daytime hot water storage tank 40 is continuously supplied to the absorption refrigerator 10. Thus, as illustrated in FIG. 5A, during the night, the water level of the daytime hot water storage tank 40 is gradually decreased.

Meanwhile, during the night, the hot water discharged from the absorption refrigerator 10 is continuously stored in the nighttime hot water storage tank 60. Thus, as illustrated in FIG. 5B, during the night, the water level of the nighttime hot water storage tank 60 is gradually increased.

In the current embodiment, an example in which the hot water stored in the daytime hot water storage tank 40 is supplied as only the heat source for the absorption refrigerator 10 for cooling in a place of which temperature is high, even during the night, has been described. However, embodiments of the present invention are not limited thereto, and the hot water may also be used for heating or hot-water supply in a region or environment of which temperature is rapidly lowered during the night.

Also, the concentration solar collector is used as the preheater 21 and the heater 22 so that the hot water having a higher temperature and a larger amount compared to a flat plate type or vacuum tube type concentrator may be obtained. Thus, twenty-four hour cooling may be more easily performed.

Figure 6:
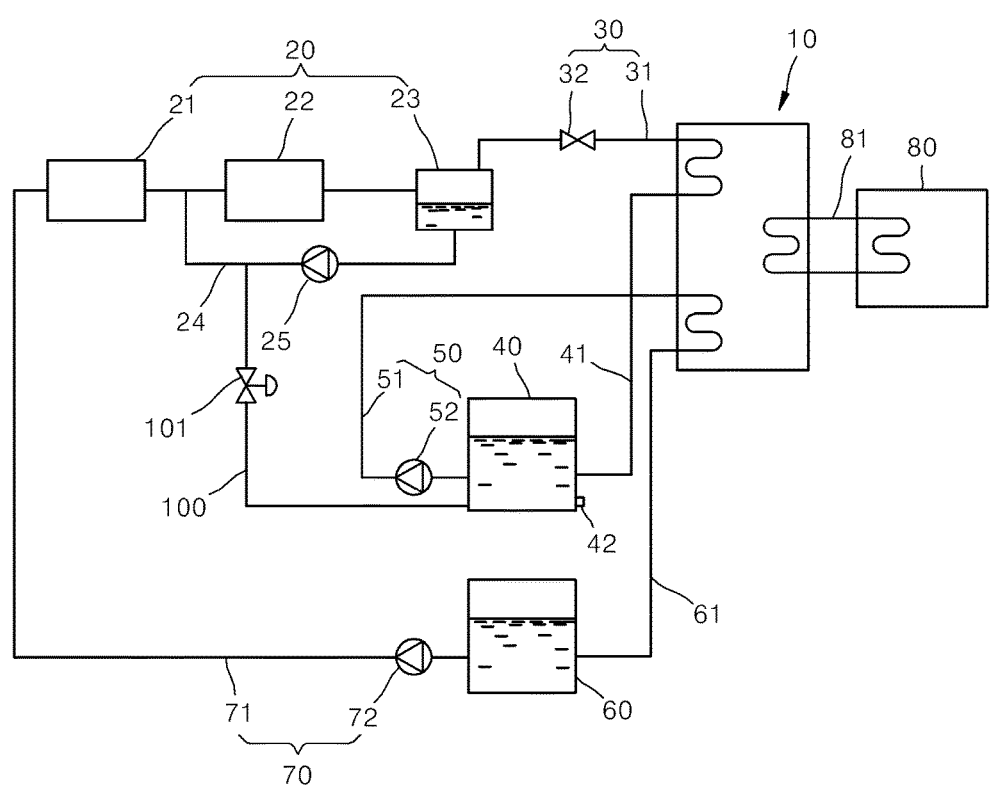
FIG. 6 is a schematic view of a configuration of a hybrid solar heat absorption cooling system according to a second embodiment of the present invention.

Meanwhile, FIG. 6 is a schematic view of a configuration of a hybrid solar heat absorption cooling system according to a second embodiment of the present invention.

Referring to FIG. 6, the hybrid solar heat absorption cooling system according to the second embodiment of the present invention is different from the hybrid solar heat absorption cooling system according to the first embodiment of the present invention in that the hybrid solar heat absorption cooling system of FIG. 6 further includes a bypass flow path 100 that bypasses at least part of hot water separated from the steam drum 23 to the daytime hot water storage tank 40. Thus, a difference therebetween will be described in detail, and the other configuration and function thereof are similar, and like reference numerals are used for like elements, and detailed descriptions thereof will be omitted.

The bypass flow path 100 is diverged from the hot water circulation flow path 24 and is connected to the daytime hot water storage tank 40. A bypass valve 101 is installed on the bypass flow path 100 so as to open/close the bypass flow path 100.

When the temperature detected by the temperature sensor 42 installed at the daytime hot water storage tank 40 is less than a predetermined set temperature, the bypass valve 101 opens the bypass flow path 100 and bypasses at least part of the hot water separated from the steam drum 23 to the daytime hot water storage tank 40. Because the temperature of the hot water separated from the steam drum 23 is higher than the temperature of the hot water discharged from the absorption refrigerator 10 and stored in the daytime hot water storage tank 40, the temperature of the hot water in the daytime hot water storage tank 40 may be increased. A flow rate control valve may be used as the bypass valve 101 so as to control a flow rate of the bypassed hot water according to the temperature of the daytime hot water storage tank 40.

An operation of the hybrid solar heat absorption cooling system having the above configuration according to the second embodiment of the present invention will be described as below.

Figure 7:
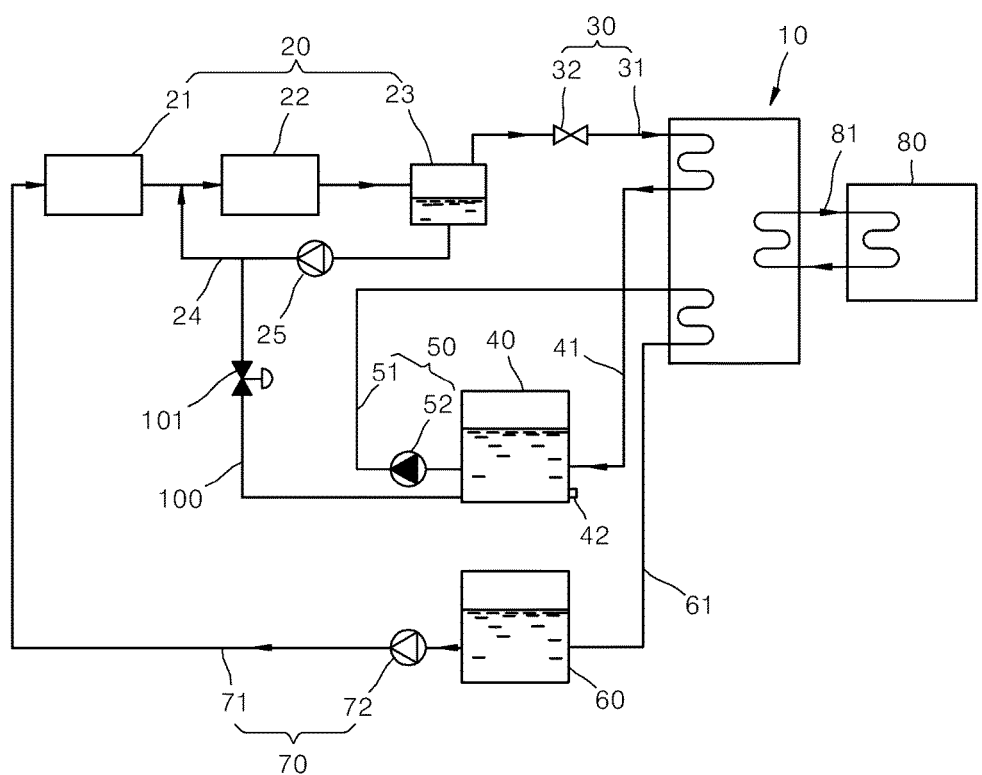
FIG. 7 is a view of a daytime operating state of the hybrid solar heat absorption cooling system illustrated in FIG. 6.

FIG. 7 is a view of a daytime operating state of the hybrid solar heat absorption cooling system illustrated in FIG. 6.

Referring to FIG. 7, when the daytime pressing hot water pump 72 operates during the day, the hot water stored in the nighttime hot water storage tank 60 is supplied to the preheater 21.

The preheater 21 collects solar heat and preheats the hot water supplied via the daytime hot water supplying flow path 71 using collected solar heat.

The hot water preheated by the preheater 21 is supplied to the heater 22. The heater 22 collects solar heat and heats the hot water discharged from the preheater 21 using collected solar heat. The hot water supplied from the preheater 21 is heated by the heater 22 and becomes wet steam. The temperature of the wet steam discharged from the heater 22 is a saturation temperature of a refrigerator supply steam pressure.

The wet steam generated by the heater 22 is supplied to the steam drum 23. The steam drum 23 separates the wet steam into dry steam and water.

Water separated from the steam drum 23 is circulated into the inlet of the heater 22 via the hot water circulation flow path 24. In this case, when the temperature detected by the temperature sensor 42 is higher than the set temperature, the bypass valve 101 is closed. Thus, water separated from the steam drum 23 is circulated into the inlet of the heater 22.

The high-temperature dry steam separated from the steam drum 23 is supplied as the heat source for the absorption refrigerator 10 via the daytime steam supplying flow path 31.

That is, during the day, the hot-temperature dry steam generated by the solar heat steam generator 20 is supplied as the heat source for the absorption refrigerator 10. The high-temperature dry steam is used to operate the regenerator of the absorption refrigerator 10, and the absorption refrigerator 10 generates low-temperature cooling water via the absorption refrigeration cycle.

The cooling water generated by the operation of the absorption refrigerator 10 is used to cool the indoor unit 80.

The hot water discharged after the heat source is supplied to the absorption refrigerator 10, is stored in the daytime hot water storage tank 40 via the daytime hot water storage flow path 41. The temperature of the hot water discharged after the heat source is supplied to the absorption refrigerator 10, is about 80° C.

Figure 8:
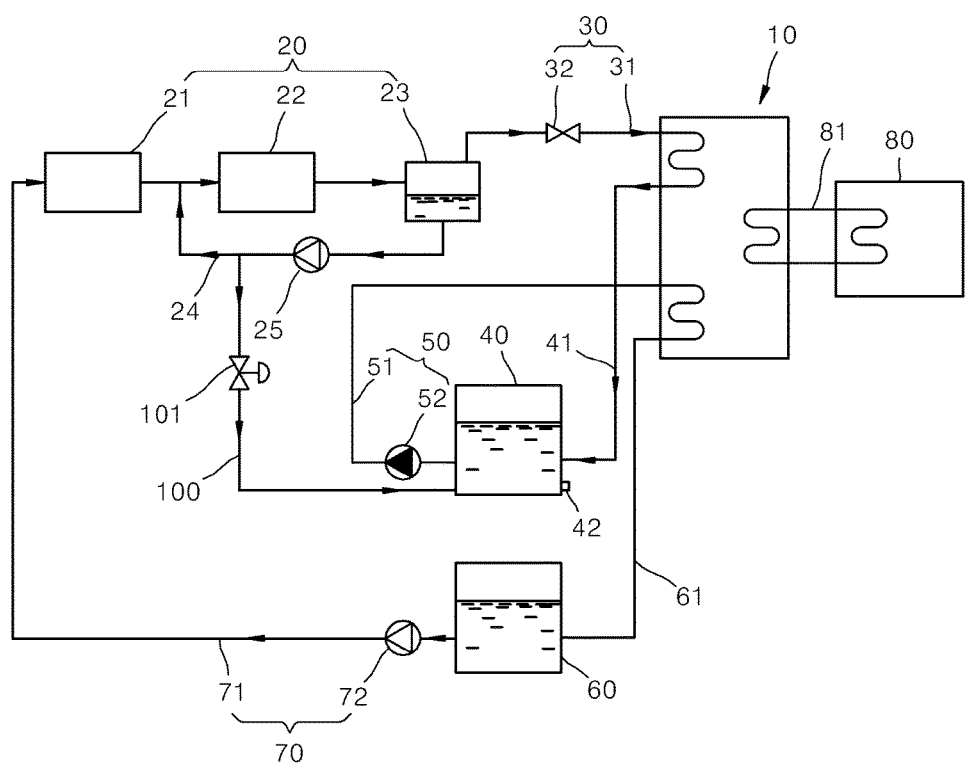
FIG. 8 is a view of a state in which, when the hybrid solar heat absorption cooling system illustrated in FIG. 7 operates during the day, hot water separated from a steam drum is bypassed to the daytime hot water storage tank.

Meanwhile, FIG. 8 is a view of a state in which, when the hybrid solar heat absorption cooling system of FIG. 7 operates during the day, hot water separated from a steam drum is bypassed to the daytime hot water storage tank.

Referring to FIG. 8, when the temperature of the hot water in the daytime hot water storage tank 40 detected by the temperature sensor 42 is less than the set temperature, the bypass valve 101 is opened. When a cooling load of the absorption refrigerator 10 is high, the temperature of the hot water discharged from the absorption refrigerator 10 is lowered, and the temperature of the hot water stored in the daytime hot water storage tank 40 is lowered to be less than the set temperature. When the temperature of the hot water stored in the daytime hot water storage tank 40 is less than the set temperature, the hot water in the daytime hot water storage tank 40 cannot be used as the heat source for the absorption refrigerator 10 during the night. Thus, the bypass valve 101 is opened to bypass the hot water generated by the steam drum 23 to the daytime hot water storage tank 40 so that the temperature of the hot water in the daytime hot water storage tank 40 may be increased. In this case, the flow rate of the bypassed hot water may be adjusted according to the temperature of the daytime hot water storage tank 40.

Figure 9:
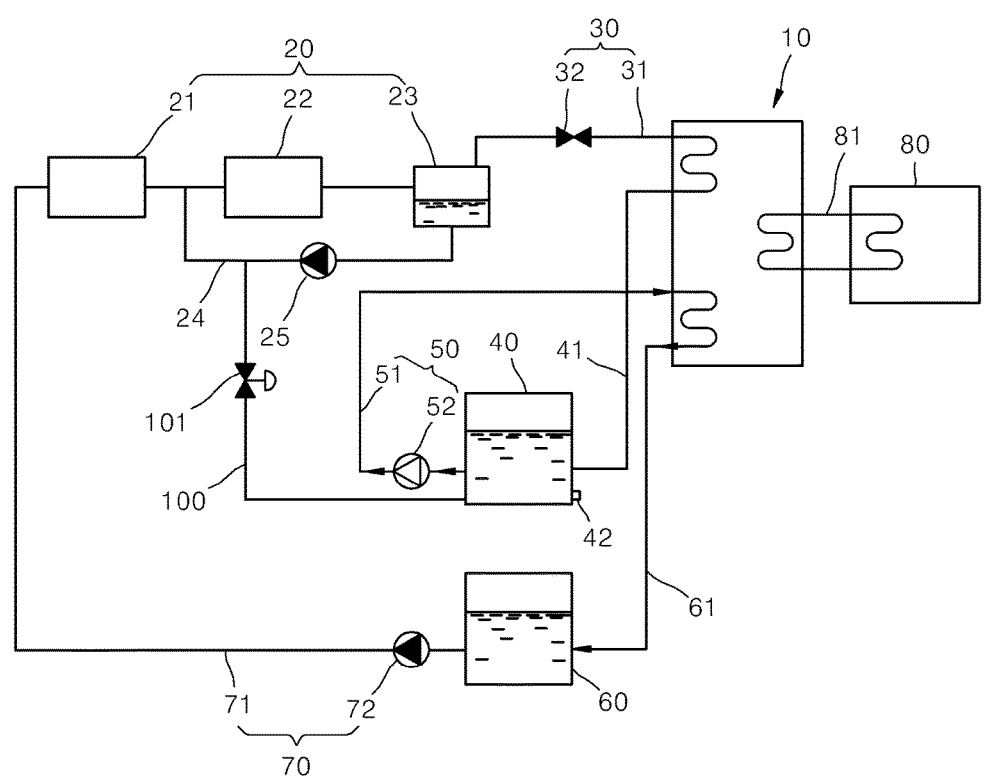
FIG. 9 is a view of a nighttime operating state of the hybrid solar heat absorption cooling system illustrated in FIG. 6.

Meanwhile, FIG. 9 is a view of a nighttime operating state of the hybrid solar heat absorption cooling system illustrated in FIG. 6.

Referring to FIG. 9, because solar heat is not collected during the night at which, no sunlight is present, the daytime steam supply valve 32 is closed, and an operation of the daytime pressing hot water pump 72 is stopped, and the nighttime hot water pump 52 operates. Also, the bypass valve 101 is closed.

When the nighttime hot water pump 52 operates, the hot water stored in the daytime hot water storage tank 40 is supplied to the absorption refrigerator 10 via the nighttime hot water supplying flow path 51. That is, during the night, the hot water stored in the daytime hot water storage tank 40 during the day is supplied as the heat source of the absorption refrigerator 10.

The absorption refrigerator 10 generates low-temperature cooling water by actuating the absorption refrigeration cycle using the hot water supplied from the daytime hot water storage tank 40 as the heat source, and the generated cooling water is used to cool the indoor unit 80.

Thus, the supply of the heat source to the absorption refrigerator 10 may be performed even during the night, as well as during the day, so that twenty-four hour cooling of the absorption refrigerator 10 may be performed.

The hot water discharged after the heat source is supplied to the absorption refrigerator 10, is stored in the nighttime hot water storage tank 60 via the nighttime hot water storage flow path 61.

In the current embodiment, an example in which the hot water stored in the daytime hot water storage tank 40 is supplied as only the heat source for the absorption refrigerator 10 during the night, has been described. However, embodiments of the present invention are not limited thereto, and the hot water may also be used for heating or hot-water supply.

While the present invention has been particularly shown and described with reference to exemplary embodiments thereof, it will be understood by those of ordinary skill in the art that various changes in form and details may be made therein without departing from the spirit and scope of the present invention as defined by the following claims.

INDUSTRIAL APPLICABILITY

According to the present invention, a hybrid solar heat absorption cooling system that enables twenty-four hour cooling can be manufactured.

The invention claimed is:

1. A hybrid solar heat absorption cooling system comprising:
an absorption refrigerator;
a solar heat steam generator comprising a concentration solar collector configured to collect solar heat and to generate wet steam and a steam drum configured to separate the wet steam generated by the concentration solar collector into dry steam and heated water;
a daytime steam supplying unit comprising a daytime steam supplying flow path that connects the steam drum and the absorption refrigerator, the daytime steam supply unit configured to supply the dry steam generated by the solar heat steam generator during the day as a heat source for the absorption refrigerator;
a daytime hot water storage tank configured to store the heated water discharged from the absorption refrigerator during the day;
a nighttime hot water supplying flow path that connects the daytime hot water storage tank and the absorption refrigerator to guide the heated water in the daytime hot water storage tank to the absorption refrigerator during the night;
a nighttime hot water pump installed on the nighttime hot water supplying flow path and operating during the night;
a nighttime hot water storage tank configured to store the heated water discharged from the absorption refrigerator during the night;
a daytime hot water supplying flow path that connects the nighttime hot water storage tank and the solar heat steam generator to guide the hot water in the nighttime hot water storage tank to the solar heat steam generator during the day;
a daytime pressing hot water pump installed on the daytime hot water supplying flow path and operating during the day;
a temperature sensor installed in the daytime hot water storage tank; and
a bypass flow path that bypasses at least part of the heated water separated from the steam drum to the daytime hot water storage tank when the temperature detected by the temperature sensor is less than a predetermined set temperature.

2. A hybrid solar heat absorption cooling system comprising:
an absorption refrigerator;
a solar heat steam generator comprising:
a concentration solar collector configured to generate steam using solar heat;
a preheater configured to primarily preheat heated water supplied from a nighttime hot water storage tank by collecting solar heat during the day;
a heater configured to secondarily heat the heated water discharged from the preheater and to evaporate the heated water; and
a steam drum configured to separate wet steam generated by the heater into dry steam and heated water, to supply the dry steam to a daytime steam supplying unit, and to allow the heated water to be circulated into the heater;
the daytime steam supplying unit comprising a daytime steam supplying flow path that connects the steam drum and the absorption refrigerator, the daytime steam supply unit configured to supply steam generated by the solar heat steam generator during the day as a heat source for the absorption refrigerator;
a daytime hot water storage tank configured to store the heated water discharged from the absorption refrigerator during the day;
a nighttime hot water supplying unit comprising a nighttime hot water supplying flow path and a nighttime hot water pump, the nighttime hot water supplying unit configured to supply the heated water stored in the daytime hot water storage tank during the night as a heat source for the absorption refrigerator;
the nighttime hot water storage tank configured to store the heated water discharged from the absorption refrigerator during the night;

a daytime hot water supplying unit comprising a daytime hot water supply flow path and a daytime pressing hot water pump, the daytime hot water supplying unit configured to supply the heated water stored in the nighttime hot water storage tank during the day to the solar heat steam generator;

a temperature sensor installed in the daytime hot water storage tank; and a bypass flow path that bypasses at least part of the heated water separated from the steam drum to the daytime hot water storage tank when a temperature detected by the temperature sensor is less than a predetermined set temperature.

3. The hybrid solar heat absorption cooling system of claim 1, wherein the solar heat steam generator further comprises a hot water circulation flow path that circulates the heated water separated from the steam drum into an inlet of the heater.

4. The hybrid solar heat absorption cooling system of claim 1, further comprising a bypass valve configured to open/close the bypass flow path.

5. The hybrid solar heat absorption cooling system of claim 1, wherein at least one of the preheater and the heater uses the concentration solar collector.

6. The hybrid solar heat absorption cooling system of claim 1, wherein the nighttime hot water supplying flow path connects the daytime hot water storage tank and the absorption refrigerator to guide the heated water in the daytime hot water storage tank to the absorption refrigerator during the night, wherein the nighttime hot water pump is installed on the nighttime hot water supplying flow path and operated during the night.

7. The hybrid solar heat absorption cooling system of claim 1, wherein the daytime hot water supplying flow path connects the nighttime hot water storage tank and the solar heat steam generator to guide the heated water in the nighttime hot water storage tank to the solar heat steam generator during the day, wherein the daytime pressing hot water pump is installed on the daytime hot water supplying flow path and operated during the day.

8. The hybrid solar heat absorption cooling system of claim 1, further comprising an auxiliary heater configured to heat the heated water stored in the daytime hot water storage tank when a temperature detected by the temperature sensor is less than the predetermined set temperature.

* * * * *